United States Patent [19]
Crane et al.

[11] Patent Number: 5,557,975
[45] Date of Patent: Sep. 24, 1996

[54] TORQUE TRANSDUCERS

[75] Inventors: David O. Crane, Lutterworth; Ian B. Golding, Rugby; Andrew C. Lester, Ratby, all of United Kingdom

[73] Assignee: Crane Electronics Limited, United Kingdom

[21] Appl. No.: 397,273

[22] PCT Filed: Sep. 14, 1993

[86] PCT No.: PCT/GB93/01943
§ 371 Date: Mar. 15, 1995
§ 102(e) Date: Mar. 15, 1995

[87] PCT Pub. No.: WO94/07119
PCT Pub. Date: Mar. 31, 1994

[51] Int. Cl.$^6$ .................................................. G01L 1/00
[52] U.S. Cl. ........................................ 73/862.338; 439/28
[58] Field of Search ................. 73/862.338; 439/23, 439/24, 25, 28, 886, 927; 310/232, 238

[56] References Cited

U.S. PATENT DOCUMENTS

| | | | |
|---|---|---|---|
| 2,353,444 | 7/1944 | Conradty et al. | 310/232 |
| 2,681,564 | 6/1954 | Jeromson, Jr. et al. | 310/232 |
| 3,042,998 | 7/1962 | Sweet et al. | 310/232 |
| 4,757,721 | 7/1988 | Horner et al. | 73/862.338 |
| 4,898,258 | 2/1990 | Ohe et al. | 180/79.1 |

*Primary Examiner*—Hezron E. Williams
*Assistant Examiner*—Ronald Biegel
*Attorney, Agent, or Firm*—Kilgannon & Steidl

[57] ABSTRACT

A torque transducer comprises strain measuring means on a torque deformable shaft and slipring means for transmitting the torque signals from the rotating shaft to stationary brush means. The slipring means are annular disc of carbon material, such as sintered graphite and the brush means are individual strips of flexible metal passing under tension partially around the respective sliprings. The electrical contact between the strain sensing means and the carbon disc is by means of printed circuit boards each of which has an annular or substantially annular portion with its conductive coating in face-to-face contact with a face of a respective carbon disc. The carbon disc and printed circuit boards being in axial compression on the shaft.

14 Claims, 6 Drawing Sheets

TORQUE TRANSDUCERS

FIELD OF THE INVENTION

The invention relates to rotating shaft torque transducers for use for example in improving the fastening of nuts and bolts to a reliable standard. The transducers may be used to calibrate the tools used for fastening or may be combined as an attachment to or as an integral part of the tool.

BACKGROUND OF THE INVENTION

Conventional strain gauges use commutator rings and carbon brushes to transmit signals from rotary strain gauges to non-rotary circuitry. This has given rise to four significant problems, the problem of signal noise due to rubbing contact, loss of signal due to contact lift under vibration conditions, the reduction in life due to wear and the distribution of electrically conductive wear particles through the assembly.

The anchorage of wires in carbon brushes to establish good metal-to-metal carbon electrical contact is well-established art. Conventionally a hole is drilled or formed in one end of a carbon rod forming the brush, and a wire or braid flexible conductor is anchored in Diace by dropping one end of the wire or braid conductor into the hole and packing metal powder, such as copper powder, into the hole around the wire. The metal powder is then tamped into place, followed by an optional sintering step. The anchorages are reasonably firm and secure, despite the fact that the carbon rod forming the brush is under a permanent potential fracture stress. Modern trends towards maintenance-free equipment mean that the performance specifications for carbon brushes are rising, and even the relatively low incidence of failure in such brushes historically accepted by the industry are now considered as unacceptable failure rates in some applications. One such application is in torque transducers for which there is a strong tendency to impose a performance specification that guarantees error free operation for life. Any such equipment, therefore, utilising traditional solid rod carbon brushes therefore falls short of that specification.

Torque measurement by strain gauges attached to torque transmitting shafts has been subject to signal noise as a result of slipring-brush contact variation. The noise can be particularly obtrusive where impact or pulse torque is applied, suddenly placing the shaft for short moment under considerable lateral vibration.

Our published patent specification EP 232606 describes a novel torque transducer in which the conventional carbon brushes for picking the electrical signals from the metal commutator sliprings are replaced by flexible strips of carbon material laminated to flexible packing strips, passing partially around metal sliprings and tensioned against the sliprings. The carbon material on the flexible laminated strips is in brushing contact with the metal sliprings, and the long arc of contact effectively removes substantially all signal noise. It is desirable that the arc of contact is in excess of 180 degrees. Moreover the problem of establishing a good carbon-to-metal electrical contact between the flexible laminated strips is solved by simply clamping each flexible laminated strip in an electrically conductive clamping member.

The above solution is highly satisfactory for most applications, but requires regular brush replacement. The constant slipping of the metal sliprings against the thin carbon layer of the flexible laminated strips causes the carbon to become worn away, and when the carbon surface is no longer contiguous, signal noise again becomes a problem. The unit cannot therefore be sold as a guaranteed service-free unit.

It is therefore highly desirable to design a torque transducer which has the low signal noise of EP 232606 but which is not subject to the same problems of wear, and which can therefore be guaranteed for a service-free life.

SUMMARY OF THE INVENTION

The invention provides a torque transducer comprising a torque deformable shaft, strain sensing means on the shaft for generating a torque related electrical signal, slipring means mounted for conjoint rotation with the shaft for receiving the signal, and flexible Strip brush means passing partially around and tensioned against the slipring means in electrical brushing contact therewith for transmitting the signal to associated electrical circuit means; wherein the slipring means comprise a plurality of discs of carbon material arranged coaxially with the shaft but electrically isolated from one another, electrical connections from the strain sensing means to the individual carbon discs being via annular or substantially annular printed circuit boards in axial compression between the carbon discs of the slipring means; and the flexible strip brush means comprise a plurality of metal strips, one per carbon slipring disc.

It is surprising that such significantly improved performance characteristics can be obtained according to the invention by reversing the positions of the carbon and the metal in the components of the torque transducer of EP 232606. However a considerable amount of design work and inventive ingenuity was needed to devise a carbon disc slipring structure which was able to establish adequate and permanent error-free electrical contact with the strain sensors. Anchorage of connector wires within the solid carbon material of the sliprings using technology conventional for the anchorage of wires in solid carbon brush rods would not have given the desired guarantees against fracture and failure in use. Indeed the stresses on the sliprings in use are very substantial indeed when the torque transducer is used in conjunction with an impact or pulse fastening tool, and it was soon discovered that conventional approaches to the anchorage of connector wires were quite unsuitable.

The inventors therefore devised the above highly effective system of using annular or largely annular printed circuit board discs to separate adjacent carbon sliprings, and at the same time using the conductive layer printed on the annular or substantially annular face of the printed circuit boards to establish direct face-to-face electrical contact with the carbon material of the slipring. Principal advantages are that the electrical connection is substantially free of fracture-inducing stresses because the array of carbon sliprings and the intervening printed circuit boards are in axial compression on the shaft. Also, the electrical contact between the printed circuit boards and the carbon sliprings is distributed evenly around the whole or substantially the whole of the annular face of each slipring, giving a more even pattern of electrical distribution than was ever previously achieved in practice. Distortions in the electrical output due to internal resistance of the sliprings is virtually eliminated.

Another very significant advantage of the torque transducer of the invention is that the rotary shaft and slipring assembly has a very much lower moment of inertia than the nearest comparable prior art shaft which is that of EP 232606. The low moment of inertia is due entirely to the fact that the carbon disc sliprings are substantially lighter than the metal sliprings of EP 232606, due to the lower density of the carbon material. This has very significant advantages in practice, eliminating the risk of slippage of the sliprings around the shaft. A low moment of inertia is also a significant advantage in the dynamic performance of the transducer when used with an impact or impulse tool. It should be borne in mind that when a torque transducer of the invention is used in connection with a pulse fastening tool, the pulses which induce movement can have a duration of only from 1–3 milliseconds, at intervals of about 20 milliseconds. These pulses can produce resulting in surface accelerations of forces several thousand g. Under accelerations of that magnitude, it is a particularly advantageous benefit of the invention that because of their relatively low moments of inertia the sliprings can be assembled sufficiently securely to resist rotary movement relative to the shaft. It may, however, be desirable to force glue or a potting compound down keyslots in the shaft, the more securely to bond the sliprings to the shaft.

The principal advantage of the invention, however, is the complete avoidance of the need, present in EP 232606, to replace the flexible strip brushes in use. The brushes of this invention are of metal, which can be made harder than the carbon material of the sliprings, so that all wear is at the sliprings rather than at the flexible strip brushes. The design can accommodate a very significant amount of wear at the carbon brushes, without any degradation of performance, and it is thus possible to design a torque transducer that can be guaranteed a totally maintenance-free service life.

DRAWINGS

FIG. 5b is a perspective view of the connector of FIG. 5a;

FIG. 9 is an enlarged plan view of the connector of FIG. 8a;

FIG. 10 is a plan view of the flexible strip brush means of FIG. 1;

DESCRIPTION WITH REFERENCE TO THE DRAWINGS

Figure 1:
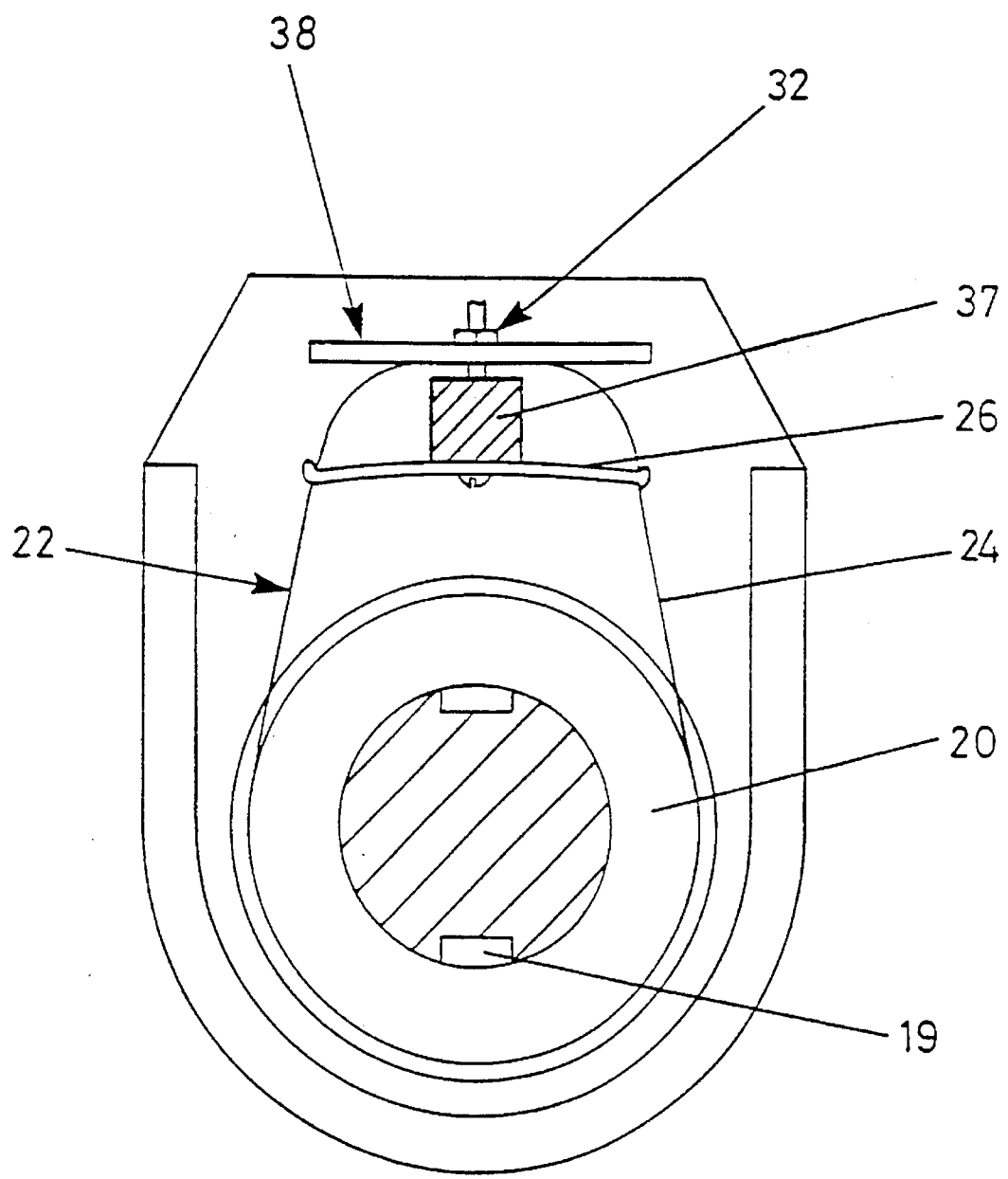
FIG. 1 is a transverse cross section through a torque transducer according to the invention.
Figure 2:
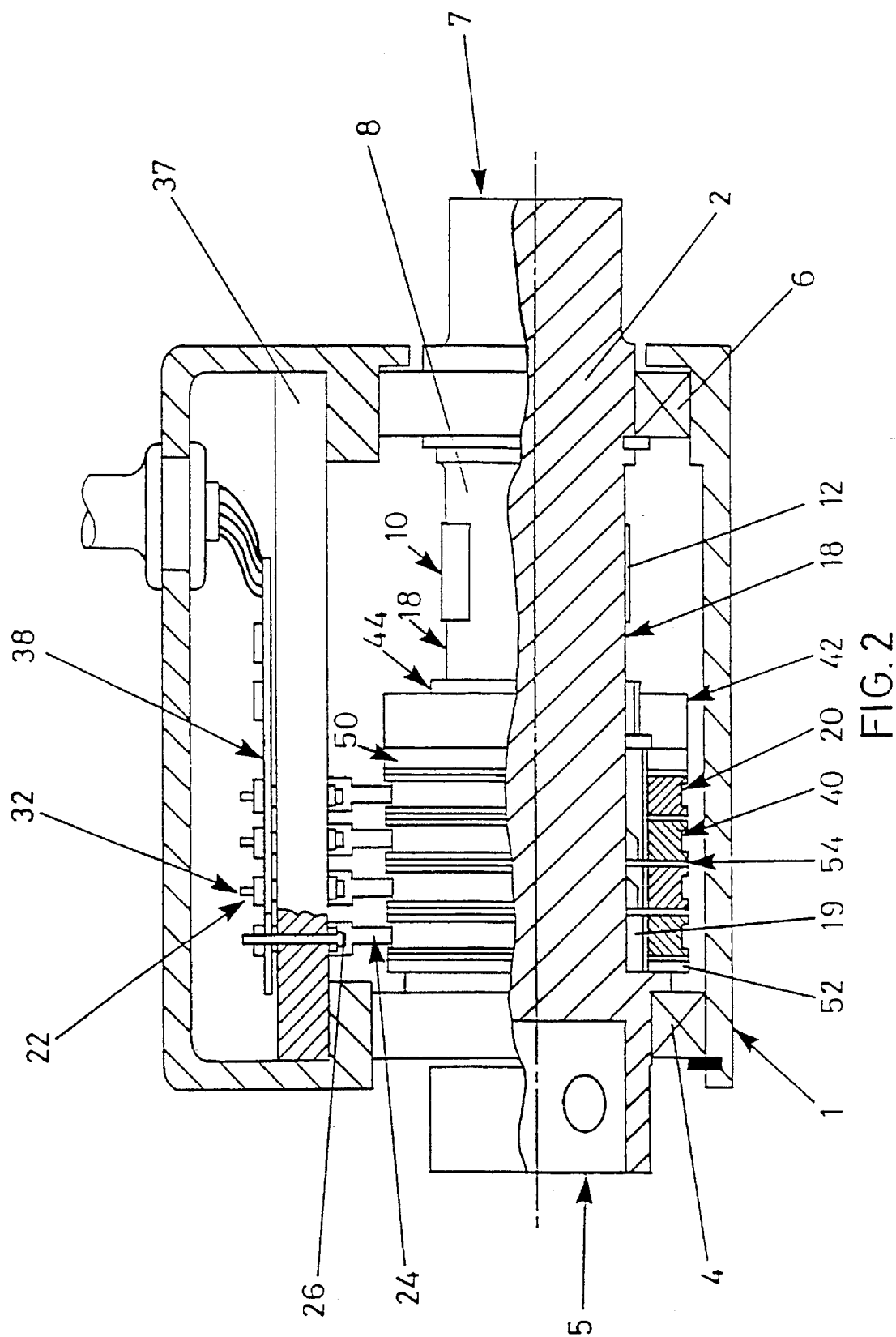
FIG. 2 is an axial section through torque transducer of FIG. 1.

Referring first to FIGS. 1 and 2, a housing 1 of a torque transducer mounts a shaft 2 between an input end bearing arrangement 4 and an output end bearing arrangement 6. The shaft 2 has a torque deformable, necked portion 8. An impact or pulse tool can be connected to the tool input end 5 of the shaft 2, and the shaft has an end 7 providing an output for a socket wrench adaptor for a fastener such as a nut.

Strain gauges 10 and 12 are connected to the necked portion 8, and wiring 18 is led from the strain gauges 10, 12 through a milled slot 19 (or a number of such milled slots) in the shaft 2 to a slipring assembly 20.

A brush assembly 22 is secured to the housing 1 and includes four flexible strips 24 connected at their ends between an insulating bar 37 and a printed circuit board 38, clamped using screws and nuts 32. A single flexible strip brush means 24 is shown in plan view in FIG. 10. It comprises a uniform width electrical pickoff portion 24a at each end of which is a slightly wider anchorage portion 24b, leading to an electrical connection portion 24c. In each anchorage portion 24b there is formed a transverse slot 24d, and at the end of each electrical connection portion 24c is formed a circular tail 24e for connection to the respective screw 32. Mounted beneath the insulating bar 37, and retained in position by the heads of the screws 32, are four tensioning springs 26 (FIG. 1) which extend in double cantilever from the bar 37. Each spring 26 has two hooked ends which pass through the transverse slots 24d of the flexible strip brush means 24 to keep the flexible strips in tension around the carbon sliprings of the slipring assembly 20.

The slipring assembly 20 comprises four carbon sliprings 40 held in compression between washers 50 and 52 by a nut 42 engaging a threaded portion 44 of the shaft. The washer 52 abuts a shoulder formed on the shaft 2. Alternatively the shoulder may extend the full diameter of the sliprings 40 to give complete support for the sliprings 40, in which case the washer 52 is redundant. The washer 50 has a key portion extending into the milled slot in the shaft 2, so that rotary motion of the nut 42, as it is tightened to compress the slipring assembly 20, is not transmitted to the individual carbon sliprings 40.

Figures 9, 10:
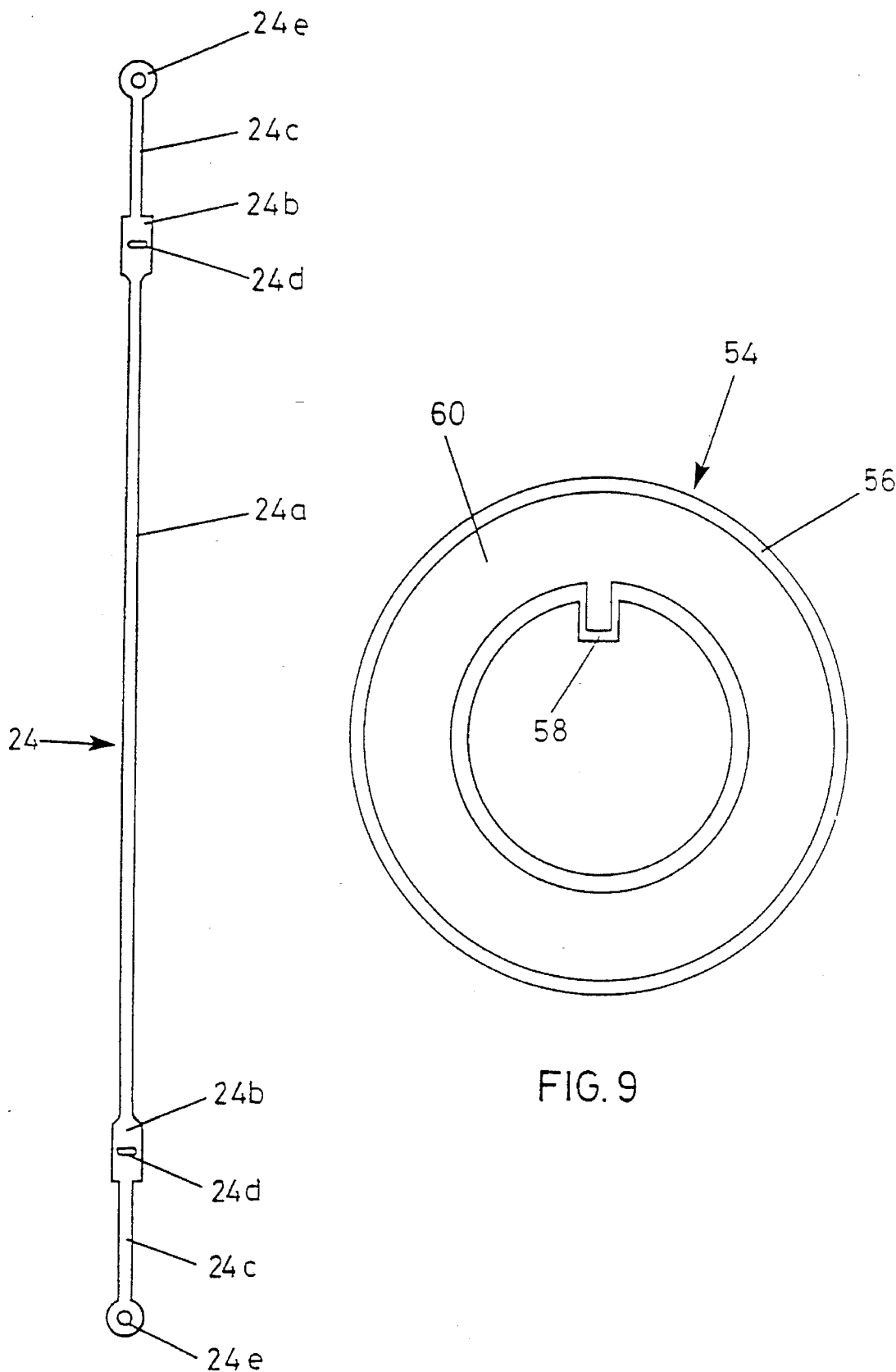

Between the end carbon sliprings 40 and the end washers 50 and 52, and between adjacent sliprings 40 in the row, are printed circuit boards 54 such as that shown in FIG. 9. These printed circuit boards 54 have the dual function of electrically insulating the carbon sliprings 40 from each other and from the end washers 50 and 52, and providing the electrical contact between the carbon sliprings 40 and the wiring 18. FIG. 9 illustrates the shape of one possible form of printed circuit board, in which an insulating backing material 56 is formed into a substantially annular shape, with a short tail portion 58 extending radially towards the centre. Deposited over the surface, or a substantial proportion of the surface, of the insulating material 56, 58 is a continuous layer 60 of electrically conductive material. When the sliprings 40 are assembled with the printed circuit boards 54 between adjacent sliprings and at the ends of the row, the electrically conductive material 60 is in secure face-to-face contact with the carbon material of the sliprings, and the tail 58 extends radially into one or other of the milled slots 19. The electrically conductive material may be applied to one side only of the printed circuit boards, or to both sides if the printed circuit boards 40 are conductive on one side only, then the equivalent effect of a double-sided board can be obtained by using the circuit boards in pairs, back to back with the electrically conductive material 60 facing outwardly into contact with the respective sliprings. However such an arrangement is primarily useful where it is desired to distribute the electrical contact over the opposite faces of the same slipring 40. Generally it will be sufficient to establish electrical contact with one face only of each slipring 40, in which case single-sided printed circuit boards are quite adequate.

Instead of printed circuit boards 40 between the end sliprings 40 and one or both of the washers 50 and 52 there may be provided simply annular insulating discs, as long as each of the sliprings 40 is connected to the wiring 18 by a printed circuit board 53 and is electrically insulated from the shaft 2.

Figure 5A:
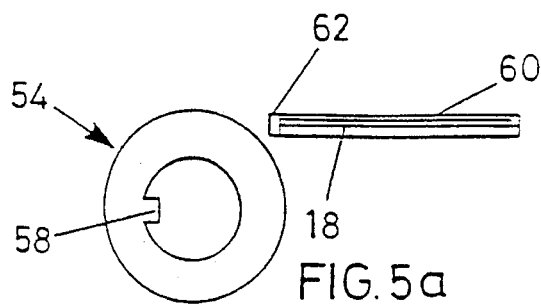
FIG. 5a is a plan view of a printed circuit board connector for use with the slipring of FIGS. 3 and 4.
Figure 5B:
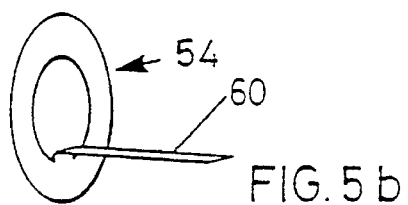

FIGS. 5a to 8b illustrate four possible alternative forms of the printed circuit boards 54. FIG. 5a shows a printed circuit board in which the insulating backing material is of the shape shown in FIG. 9. Soldered onto the electrically conductive coating 60 on the tail portion 58 is a printed circuit strip 60, on which the wiring 18 has been deposited as a printed circuit. The shaded end portion 62 of the strip 60 in FIG. 5a is that portion which is soldered to the electrically conductive covering on the tail portion 58. The printed circuit board 54 of FIG. 5a preferably utilizes a flexible insulating material, so that after soldering 62 to 58, the printed circuit board can adopt the bent shade shown in FIG. 5b.

Figure 6A:
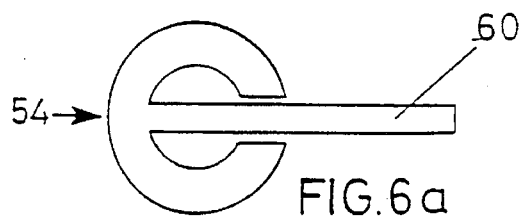
FIGS. 6a, 6b, 7a, 7b, 8a and 8b are views corresponding to FIGS. 5a and 5b respectively but of alternative printed circuit board connectors.
Figure 6B:
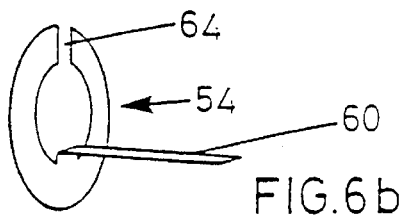

FIGS. 6a and 6b show how a similar configuration of printed circuit board can be obtained without the need for a soldered joint. The extended printed circuit strip 60 is made integrally with the remainder of the printed circuit board 54, the substantially annular portion of which is formed with a peripheral cutout portion or gap 64 as most clearly shown in FIG. 6b. A very thin printed circuit board is needed for this construction, to avoid placing unnecessary strain on the carbon sliprings 40 on assembly.

Figure 7A:
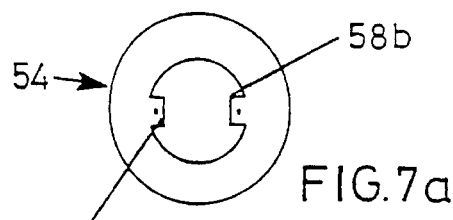
Figure 7B:
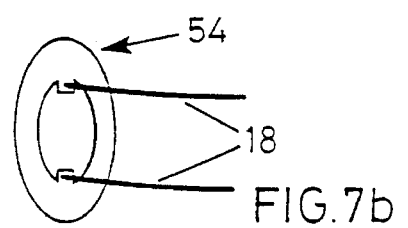

A thicker printed circuit board can be used for the construction of FIG. 7a, which construction is suitable for a double-sided printed circuit board in which electrically conductive material is applied to both sides of the insulating material. Two tail portions 58a and 58b are provided, one of which carries the electrically conductive material from one side of the board and the other of which carries the electrically conductive material from the other side of the board. Pin-sized holes are formed through the tail portions 58a and 58b, to allow point soldering of wires 18 as shown in FIG. 7b.

Figure 8A:
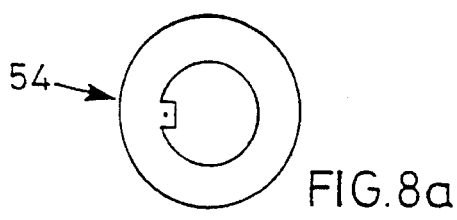
Figure 8B:
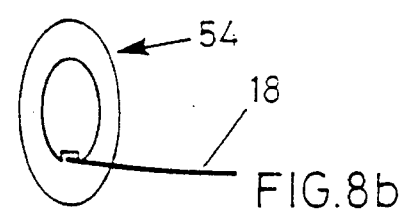

FIGS. 8a and 8b illustrate how a similar point soldering technique can be used to attach wires 18 to a printed circuit board applied with electrically conductive material on one side only.

Figure 3:
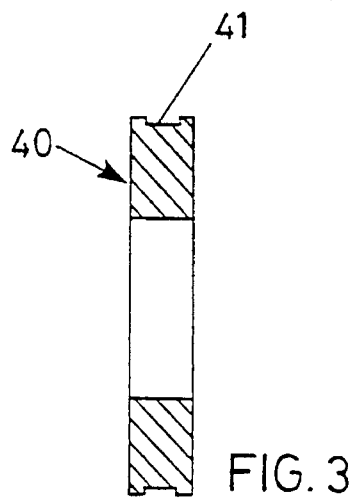
FIG. 3 is an axial section through one carbon disc slipring of the transducer of FIGS. 1 and 2.
Figure 4:
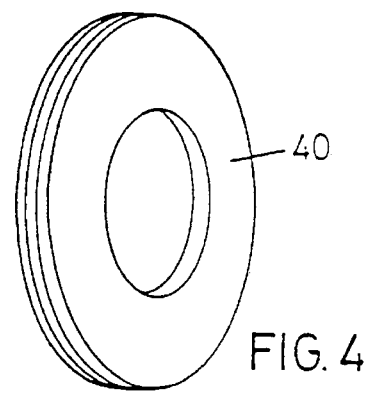
FIG. 4 is an isometric view of the slipring of FIG. 3.

Assembly of the slipring assembly 20 onto the shaft 2 is achieved by placing the successive elements of the array of washers, printed circuit boards and sliprings in turn on the shaft 2. The nut 42 is then tightened 5o exert an axial compression on the stack of carbon sliprings 40, so as to bring those sliprings into good and intimate electrical connection with the electrically conductive coatings 60 on the respective printed circuit boards 54. The shaft is then placed between centres on a lathe turned on the lathe to bring the graphite disc sliprings to a a common diameter, and axial grooves 41 (FIG. 3) are machined into the outer peripheries of the carbon sliprings 40, for accurate placement of the flexible strip brush means 24.

If desired, either before or after the machining, adhesive or potting compound can be injected under pressure along the milled slots 19 so as more firmly to secure the carbon sliprings 40 the shaft 2.

Figure 11:
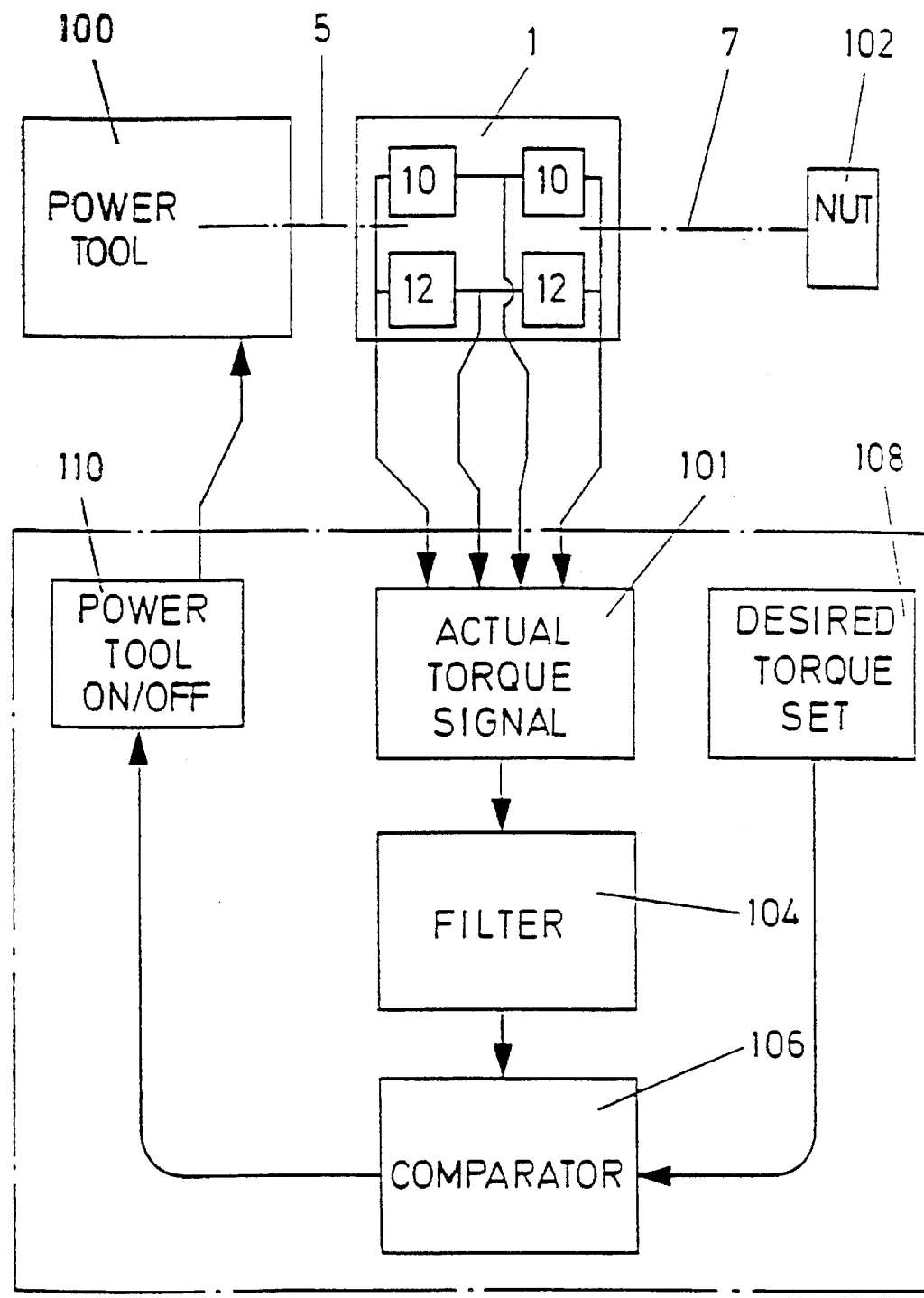
FIG. 11 is a block diagram of the control system for the torque transducer of FIG. 1.

FIG. 11 shows schematically a pulse tool 100 connected to the tool input end 5 of the shaft 2, and a nut 102 operated on through the output end 7. The strain gauges 10 and 12 of the torque transducer are connected in a Wheatstone bridge configuration along the four channels provided by sliprings 40 and strips 24, to a circuit 101 to generate a signal indicative of the actual torque. That signal can be passed to a RC network 104 so as to filter out noise and modulate the actual torque signal so as to make it proportional to the torque retained by the nut. The torque retained signal is then passed to a comparator 106 which compares the signal with a sortable reference signal from setting means 108 to switch the power to control circuit 110 off when the reference signal level has been reached.

Figure 12:
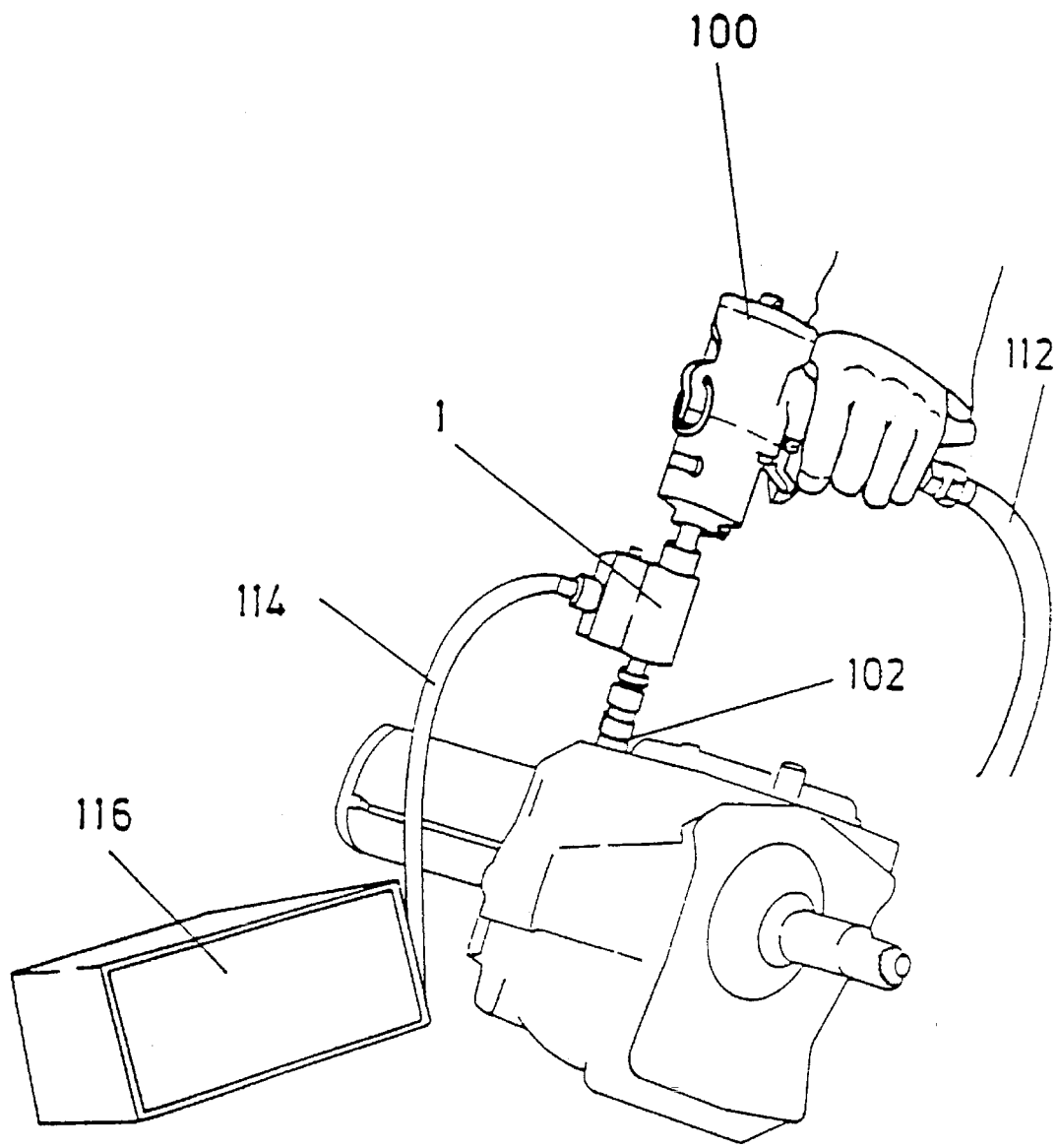
FIG. 12 is a perspective view of the torque transducer in use.

FIG. 12 illustrates the torque transducer in use. The tool 100 is powered through a hose 112. The output from the transducer 1 is passed by cable 114 to a box 116 containing the circuitry described above with reference to FIG. 11. It can be observed that the transducer 1 is compact. In modified arrangements, the circuitry and display from box 116 may be integrated with the tool 100 or with the torque transducer 1.

We claim:

1. A torque transducer comprising:

a torque deformable shaft strain sensing means on the shaft for generating a torque related electrical signal, slipring means mounted for conjoint rotation with the shaft for receiving the signal, and flexible strip brush means passing partially around and tensioned against the slipring means in electrical brushing contact therewith for transmitting the signal to associated electrical circuit means;

wherein the slipring means comprise a plurality of discs of carbon material arranged coaxially with the shaft but electrically isolated from one another, electrical connections from the strain sensing means to the individual carbon discs being via annular or substantially annular printed circuit boards in axial compression between the carbon discs of the slipring means: and the flexible strip brush means comprise a plurality of metal strips, one per carbon slipring disc.

2. A torque transducer according to claim 1, wherein the printed circuit boards comprise an annular or substantially annular portion and an inwardly directed tab portion, with an electrically conductive layer over at least one face extending over both the annular or substantially annular portion and the tab portion, connected to an electrical input lead at the tab portion.

3. A torque transducer according to claim 2, wherein the electrical input lead is a flexible printed circuit board conductor.

4. A torque transducer according to claim 2, wherein the electrical input lead is a wire.

5. A torque transducer according to claim 2, wherein the torque deformable shaft has formed therein at least one axially extending milled slot housing the strain sensing means, into which the inwardly directed tab portions of the printed circuit boards extend.

6. A torque transducer according to claim 5, wherein all void space between the shaft, the carbon disc sliprings and the printed circuit boards is filled by an injected potting compound.

7. A torque transducer according to claim 1, wherein the metal strips of the flexible strip brush means comprise strips of a chemically milled beryllium-copper strip which has been gold plated.

8. A torque transducer according to claim 7, wherein each strip is about 1 mm in width and 0.05 mm in thickness.

9. A torque transducer according to claim 1, wherein the gold plating comprises an underlay coating of soft gold and a surface layer coating of hard gold.

10. A torque transducer according to claim 9, wherein the thickness of the soft gold layer is from 4 to 6 microns.

11. A torque transducer according to claim 10, wherein the thickness of the hard gold layer is from 3 to 4 microns.

12. A torque transducer according to claim 1, wherein the metal strips of the flexible strip brush means are tensioned by engagement with opposite ends of a cantilever spring that is held fast at a mid point.

13. A method of assembly of a torque transducer according to claim 1, which comprises placing the array of graphite disc sliprings and printed circuit board electrical connectors on the shaft, tightening a compression means to place the printed circuit boards in axial compression and bring them into good electrical contact with the end faces of the individual sliprings, and then turning the shaft on a lathe to bring the graphite disc sliprings to a common diameter.

14. A method according to claim 13, wherein during the turning operation a peripheral groove is formed in each carbon disc slipring to act as axial location for the associated flexible strip brush means on final assembly.

\* \* \* \* \*

UNITED STATES PATENT AND TRADEMARK OFFICE
CERTIFICATE OF CORRECTION

PATENT NO. : 5,557,975
DATED : September 24, 1996
INVENTOR(S) : Crane, et al.

It is certified that error appears in the above-indentified patent and that said Letters Patent is hereby corrected as shown below:

Column 1, line 25 reads "Diace", should read --place--

Column 1, line 46 reads "moment", should read --moments--

Column 2, line 16 reads "Strip", should read --strip--

Column 3, lines 12-13 reads "These pulses can produce resulting in surface accelerations of forces several thousand g.", should read --These pulses can produce forces resulting in surface accelerations of several thousand "g." One "g" represents 9.81 m/s$^2$.--

Column 5, line 45 reads "5o", should read --to--

Column 6, line 4 reads "sortable", should read --settable--

Signed and Sealed this

Second Day of June, 1998

Attest:

BRUCE LEHMAN

*Attesting Officer*   *Commissioner of Patents and Trademarks*